Feb. 26, 1952 A. PEPLOW 2,587,520
ADJUSTABLE POWER-DRIVEN TOOL SUPPORT
Filed Nov. 5, 1948
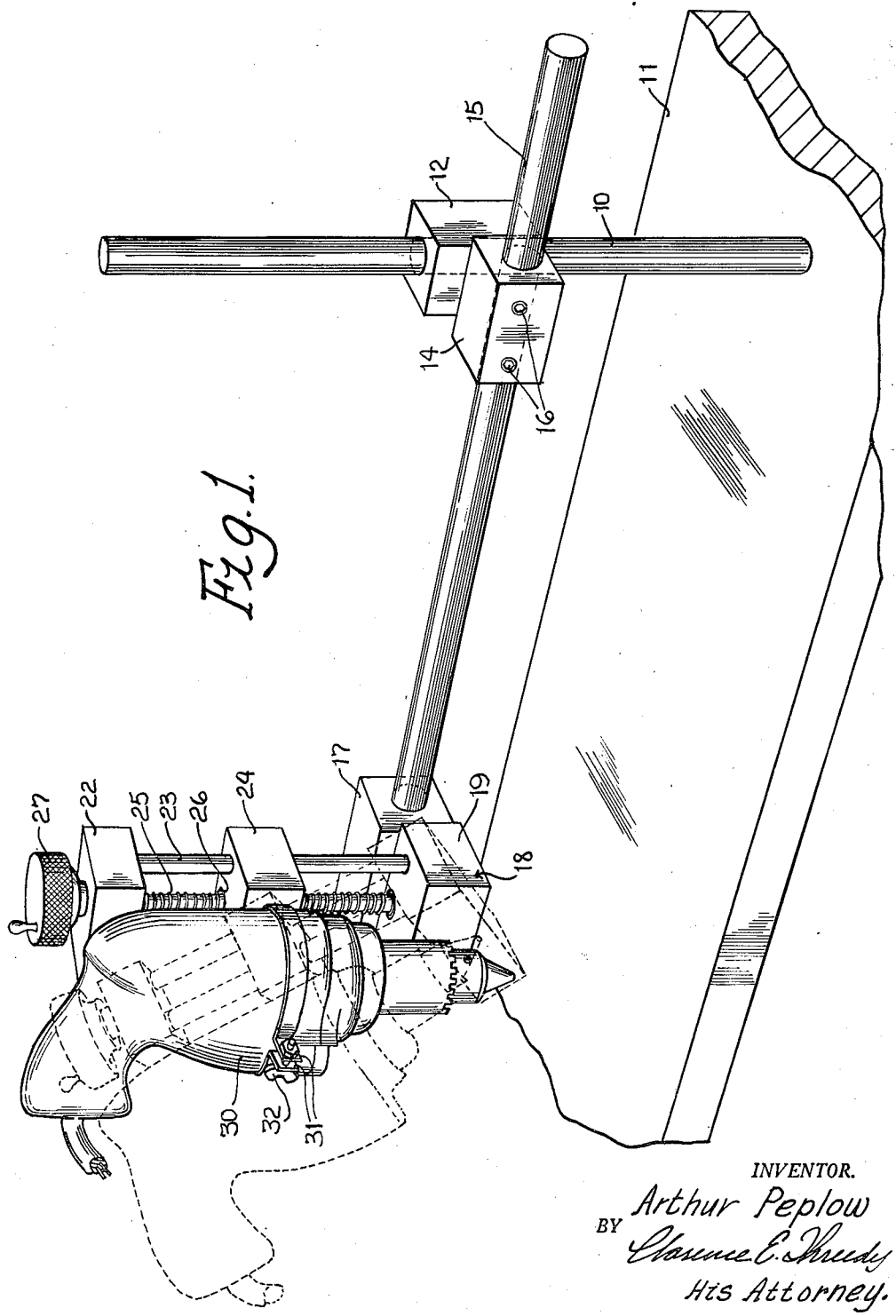
INVENTOR.
Arthur Peplow
BY
His Attorney.

Feb. 26, 1952 A. PEPLOW 2,587,520
ADJUSTABLE POWER-DRIVEN TOOL SUPPORT
Filed Nov. 5, 1948 2 SHEETS—SHEET 2
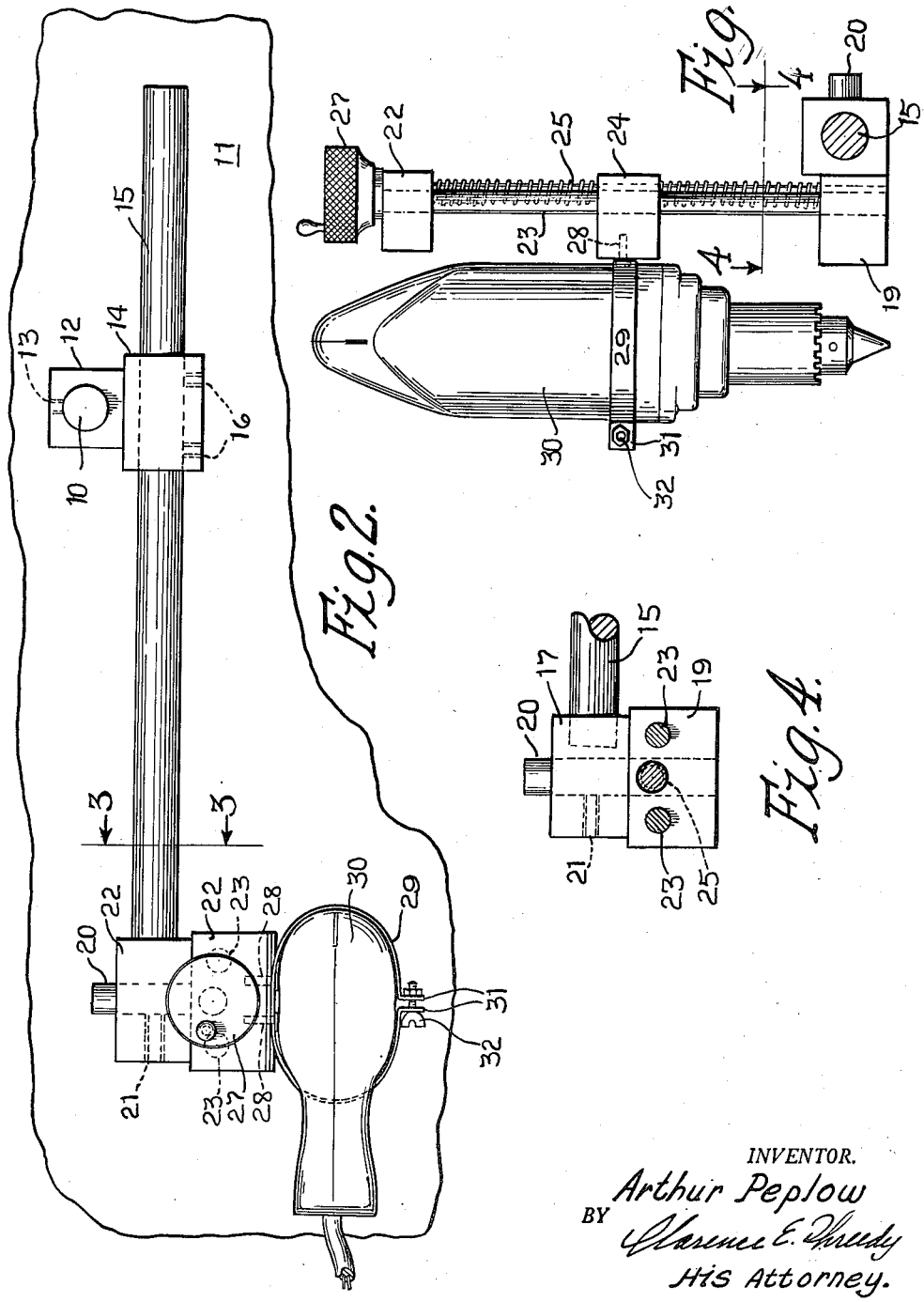
INVENTOR.
Arthur Peplow
BY
His Attorney.

Patented Feb. 26, 1952

2,587,520

UNITED STATES PATENT OFFICE 2,587,520

ADJUSTABLE POWER-DRIVEN TOOL SUPPORT

Arthur Peplow, Chicago, Ill.

Application November 5, 1948, Serial No. 58,469

1 Claim. (Cl. 77—31)

This invention relates to certain new and useful improvements in adjustable power-driven tool supporters, and has for its principal object the provision of an improved construction of a device of this character for supporting the tool in various angular positions and in spaced relation with respect to a work table whereby the tool may be easily manipulated in various angular positions with respect to work supported by the table.

While the tool supporting device is especially designed for home use, it is clear that the same may be used for industrial purposes.

Another and equally important object of my invention is the provision of a device of this character which, by reason of comprising the minimum number of parts, may be manufactured at an economical cost.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the device embodying my invention;

Fig. 2 is a top plan view of the same;

Fig. 3 is a sectional detail view taken substantially on line 3—3 of Fig. 2; and Fig. 4 is a sectional detail view taken on line 4—4 of Fig. 3.

The several objects of my invention may be best accomplished by the preferred form of construction shown in the accompanying drawings. In this connection a shaft 10 in a suitable manner is fixed to a work table 11 or to a support of any approved character. This shaft 10 extends vertically with respect to the horizontal table 11 and has slidably mounted thereon a block 12. This block 12 is secured in an adjusted position upon the shaft 10 by means of set screws 13.

Formed as part of this block 12 and movable therewith is a block 14. This block 14 slidably carries a horizontally extending shaft 15 and is secured in an adjusted position upon this shaft 15 by set screws 16. One end of this shaft 15 terminates into a block 17. Connected to this block 17 for pivotal movement relative thereto is a tool carriage 18. The base 19 of this tool carriage has a stud shaft 20 which provides pivotal connection between the tool carriage 18 and the block 17. The tool carriage is secured in an adjusted position with respect to the block 17 by set screws 21.

The base 19 is connected in spaced parallel relation with respect to a top plate 22 by parallelly extending spaced rods 23. Slidably mounted on these rods 23 is a carriage block 24. Rotatably carried by the top plate 22 and the base 19 of the tool carriage is a screw shaft 25 adapted to be threaded through a threaded opening 26 of the carriage block 24. The lower end portion of this screw shaft 25 is rotatably fixed to the base 19 and at its upper end portion carries an operating handle 27 whereby the screw shaft 25 may be rotated to adjust the carriage block 24 relative to the rods 23.

Secured by suitable connecting elements 28 to the carriage block 24 is a clamping band 29 adapted to embrace the casing of the power-driven tool 30. The ends 31 of this clamping band are connected together by a wing nut bearing bolt 32 whereby the band 29 may be securely clamped to the casing of the tool 30.

The tool 30 is illustrated as an electric power-driven drill. However power-driven tools such as saws, bores, routers, and many other type tools, may be used with as equally efficient support from the tool carriage 18.

From the foregoing description it is clear that by adjusting the block 12 relative to the shaft 10 the tool carriage may be adjusted vertically with respect to the work plate 11. By adjusting the block 12 radially with respect to the shaft 10 the tool carriage may be adjusted transversely of the work plate 11. By moving the shaft 15 relative to the block 14 the work carriage 18 may be adjusted longitudinally with respect to the work table 11. By rotating the shaft 15 relative to the block 14 the tool carriage may be adjusted at an angle with respect to the work plate 11. By adjusting the work carriage relative to the block 17 the tool carriage 18 may be adjusted angularly with respect to the long axis of the work table 11. Finally by adjusting the screw shaft 25 the tool 30 may be adjusted vertically with respect to the work table 11.

By reason of the foregoing construction the tool may be adjusted in many positions with respect to the work or in such position as the work requires the tool to be adjusted.

These adjustments may be accomplished by a very simple operation as it is apparent that I employ set screws for holding the parts in adjusted positions.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A tool-supporting assembly for power-driven tools, said assembly comprising a work table presenting a horizontal face, a vertically extending rod fixedly secured thereto, a block carried by and adjustable longitudinally and swingingly on the rod, said block having a side face carrying a block element having an opening therethrough the axis of which extends horizontally in parallelism with the table top, a second rod of extended length extending axially through and adjustably mounted in said block element opening for pivotal and axial adjustment therein, one end of said latter rod carrying a support block thereon remote from the vertical rod, said support block carrying a stub shaft extending transversely therethrough and transverse to the axis of the second rod to thereby form a tool unit support having an adjustable position relative to the work table, the second rod and its support block being arranged in parallelism with and at adjustable distances from the table top by adjustment in an arcuate path about the vertical rod and being individually adjustable pivotally and longitudinally to determine the active position of the stub shaft axis, and a tool carriage unit carried by and pivotally adjustable on said stub shaft, said unit including a block mounted on said stub shaft for pivotal adjustment thereon, said latter block forming the lower member of the unit, a second block permanently spaced above such lower block and connected therewith by a manually rotatable element having a thread zone intermediate the said unit upper and lower end blocks, the latter blocks being further connected by a pair of connecting rods in laterally spaced relation to the thread zone, a travel block intermediate the unit end blocks and supported by such thread zone and the connecting rods and movable longitudinally of the zone and rods by manual rotation of the threaded element, and means carried by said travel block removably embracing a mid-zone of the length of a power driven removable work performing assembly tool to thereby provide a fixed relation between the latter assembly and the unit with both bodily movable together adjustably about the stub shaft axis and with the tool assembly movable bodily in the direction of unit length adjustably by travel block movement to thereby position the tool axis relative to the table top as to location of the tool axis and of such axis angularity to the table top.

ARTHUR PEPLOW.

REFERENCES CITED

The following references are of record in the file of this patent:

UNITED STATES PATENTS

| Number | Name | Date |
|---|---|---|
| 573,231 | McSweeney | Dec. 15, 1896 |
| 599,914 | Nitschmann | Mar. 1, 1898 |
| 1,052,767 | Teague | Feb. 11, 1913 |
| 1,852,736 | Connell | Apr. 5, 1932 |